T. GALLOWAY & J. LARSEN.
Locking Device for the Teeth of Seeders.
No. 208,014. Patented Sept. 17, 1878.
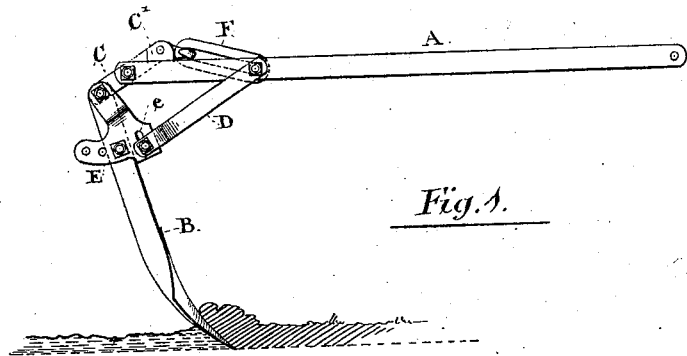
Fig. 1.
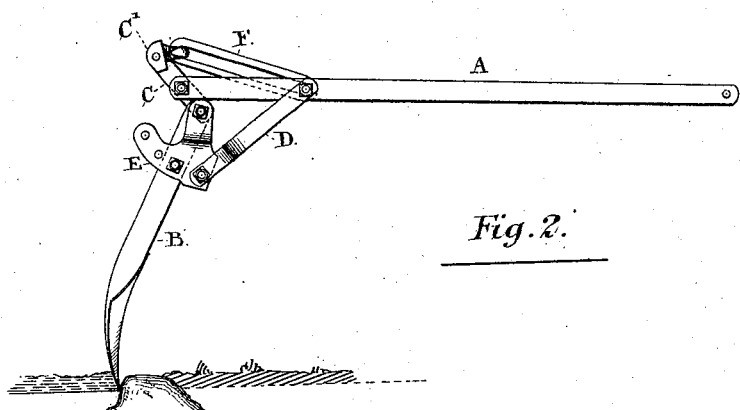
Fig. 2.
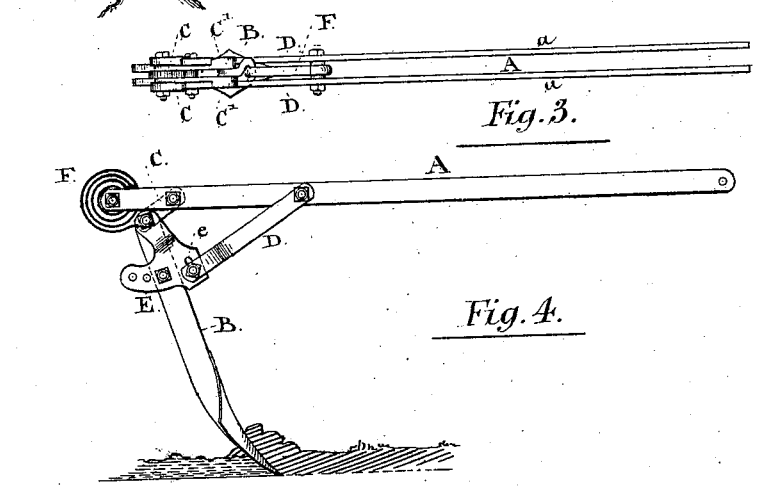
Fig. 3.
Fig. 4.
Witnesses:
L. Whitehead
A. E. Curran
Inventors:
Thomas Galloway
John Larsen
by Ridout & Kird & Co
Attys

UNITED STATES PATENT OFFICE

THOMAS GALLOWAY AND JOHN LARSEN, OF OSHAWA, ONTARIO, CANADA.

IMPROVEMENT IN LOCKING DEVICES FOR THE TEETH OF SEEDERS.

Specification forming part of Letters Patent No. 208,014, dated September 17, 1878; application filed June 5, 1878.

*To all whom it may concern:*

Be it known that we, THOMAS GALLOWAY and JOHN LARSEN, both of the village of Oshawa, in the county of Ontario, and Province of Ontario, Canada, have jointly invented certain new and useful Improvements in Flexible Locking Devices for the Teeth of Seeding and other Machines, and which improvement is fully set forth in the following specification and accompanying drawing.

Our invention has relation to an improved form of flexible locking, retaining, and returning device for the teeth of seeding and cultivating machines, the principles of construction and the operation of which are more fully described hereinafter.

In the accompanying drawings, Figures 1 and 2 are side views of a drag-bar and tooth of a broad-cast seeding and cultivating machine in which our improvements are embodied. Fig. 3 is a plan of the same. Fig. 4 is a detail, showing an alternative arrangement and manner of applying the returning-spring.

The principle upon which our improvement is based is that of opposing levers, connected together by links and blocks, and arranged in such manner that the constant strain on one lever will hold the other lever in a fixed position until extra strain is brought to bear on, or a shock is given to, the latter, causing it to gain the ascendency and assume a position governed by the connecting-links.

A is the drag-bar, consisting of the double bar *a a*, representing one lever of the combination, while B, the cultivator-tooth, represents the other. The ends of these levers are pivoted to opposite ends of a link, C, thus forming a flexible or double hinge-connection between the two levers. D are links, connected to the drag-bar and tooth by pins or bolts at a suitable intermediate point between their ends, the point of connection on each forming the fulcrum on which each of the levers act. The links C and D are placed at or about parallel to each other, and the proportion of the length of the short arm to the long arm in each lever is equal. The result of this combination is that a dead-lock would be produced when the same weight or strain was placed at the end of each lever.

In practice, this dead-lock is overcome and a portion of its useful quality still retained (as one method of several, hereinafter mentioned) by the extra weight of the drag-bar, which gives to it as a lever the ascendency over the other, and the command of the lock.

In order that the drag-bar may be held in a fixed position or angle to the ground and the drag-bar, the ends of the links C are produced, and check-blocks C' placed thereon. The under faces of these check-blocks bear on the upper face of the drag-bars, forming a stop, which prevents strain on the drag-bar forcing the tooth out of position, but does not destroy the supremacy of it as a lever under ordinary circumstances; but when the tooth strikes an unyielding obstruction, such as a heavy stone, root, or stump, the shock of the blow destroys the resistance of the drag-bar, (which cannot move from its position on account of the check-blocks C' on the link C,) and permits the tooth to turn on its fulcrum, the lower part flying backward, and the upper part, with the link C, forward. The tooth is returned to its place and the normal position of the parts restored by a spring, F, connected to the end of the links C and the drag-bar, as shown in Figs. 1 and 2, or as shown in Fig. 4, or in any other suitable manner. The spring is not an element of the lock, or in the combination by which the tooth is retained in position, but is merely used for the purpose of returning the tooth to position after displacement, which service can be performed by a variety of forms of spring, or by a weight, if preferred.

It will be observed, as a point of great advantage, that once the lock is broken there is but little resistance offered to the movement of the tooth by the ends of the drag-bar, and that resistance is made only at the beginning of the stroke. During the latter major portion of the movement the drag-bar assists in the displacement of the tooth.

The strength of the lock may be varied to suit different qualities or conditions of lands by moving the ends of the links D up or down, as required, in the slot *e* of the quadrant brackets E, thus changing the proportions of the opposing levers on the tooth. These quadrant brackets, as described in a previous patent, permit the angle of the tooth to the ground to be varied without altering or affecting the conditions of the locking combination.

The strength of the lock could be varied in an equivalent manner by changing the point of attachments of the draft-rods to the drag-bar. Any change made at this point, it will be seen, alters the proportion of the levers, making the drag-bar (considered as a lever) strong or weak.

We are aware that various forms of flexible locking devices for the teeth of seeders and cultivators have been used in which a form of toggle-joint is introduced between the tooth and the drag-bar. To such our invention has no relation, the locking and retaining parts working on a different principle altogether.

We claim as new and desire to secure by Letters Patent—

1. The draw-bar A and tooth B, connected at one end by the link C, and at an intermediate point by the link D, whereby the draw-bar and tooth are divided into levers of about equal proportions, which, when the draft is applied, oppose each other, and, in connection with the links C D, form a lock, the rigidity of which may be utilized and varied in strength for the purpose of retaining the tooth B in working position, substantially in the manner and for the purpose set forth.

2. The link C, with check-block C', in combination with the tooth B, drag-bar A, and link D, substantially as shown.

3. The tooth-retaining spring F, in combination with the bars A, links D and C, and tooth B, substantially as described.

THOMAS GALLOWAY.
JOHN LARSEN.

Witnesses:
THOMAS J. H. BRIMICOMBE,
RICHARD McPHERSON.